(No Model.) 2 Sheets—Sheet 1.

G. P. FENNER.
OPERATING MECHANISM FOR PRINTING PRESSES.

No. 576,442. Patented Feb. 2, 1897.

WITNESSES:
William M. Miller
Chas. E. Poensgen

INVENTOR
George P. Fenner.
BY
Hauff + Hauff
ATTORNEYS (No Model.) 2 Sheets—Sheet 2.

G. P. FENNER.
OPERATING MECHANISM FOR PRINTING PRESSES.

No. 576,442. Patented Feb. 2, 1897.

WITNESSES:
William Miller
Chas. E. Poensgen

INVENTOR
George P. Fenner.
BY
Hauff + Hauff
ATTORNEYS

UNITED STATES PATENT OFFICE.

GEORGE P. FENNER, OF NEW LONDON, CONNECTICUT.

OPERATING MECHANISM FOR PRINTING-PRESSES.

SPECIFICATION forming part of Letters Patent No. 576,442, dated February 2, 1897.

Application filed April 24, 1896. Serial No. 588,924. (No model.)

*To all whom it may concern:*

Be it known that I, GEORGE P. FENNER, a citizen of the United States, residing at New London, in the county of New London and State of Connecticut, have invented new and useful Improvements in Operating Mechanisms for Printing-Presses, of which the following is a specification.

The object of this invention is to secure easy and accurate running of the driving mechanism for the type-bed of printing-presses; and the invention resides in the novel features of construction set forth in the following specification and claims and illustrated in the annexed drawings, in which—

Figure 1:
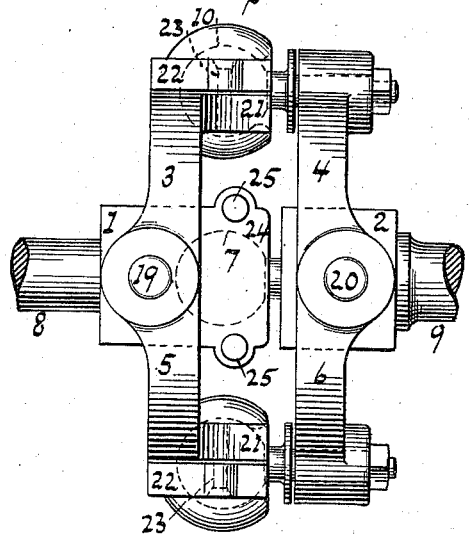
Figure 2:
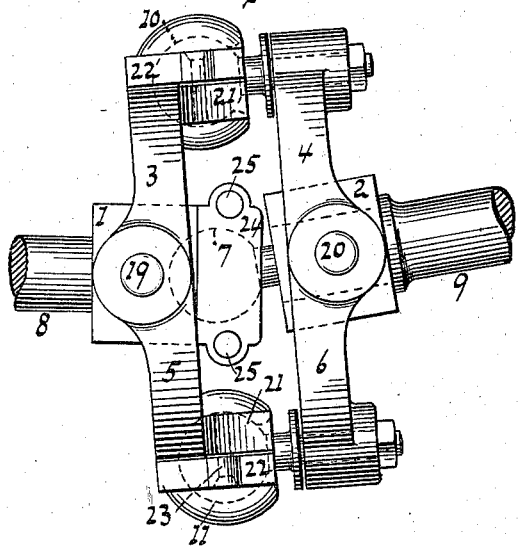
Figure 3:
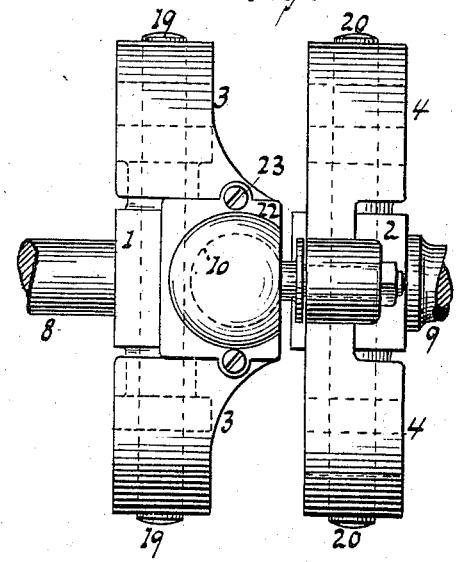
Figure 4:
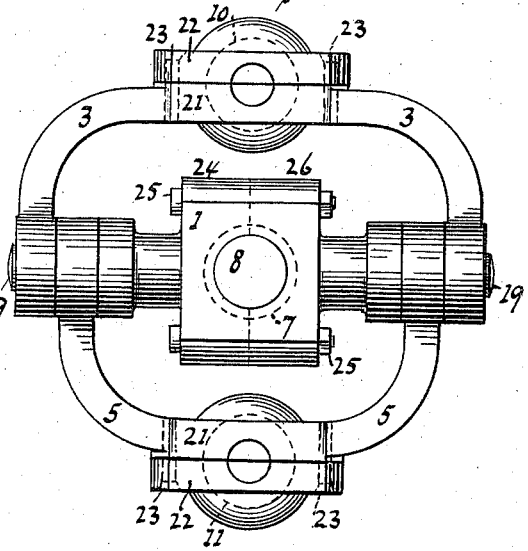
Figure 5:
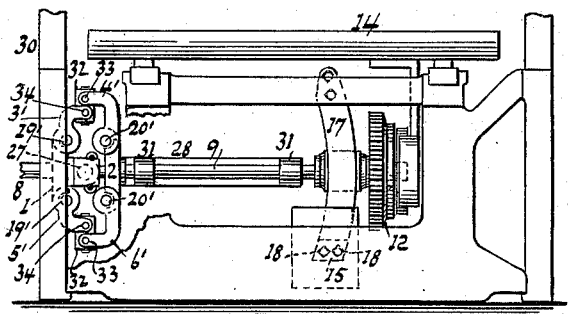
Figure 6:
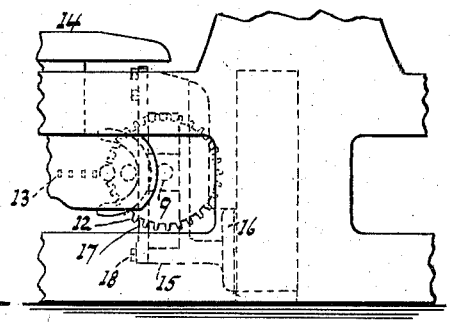
Figure 7:
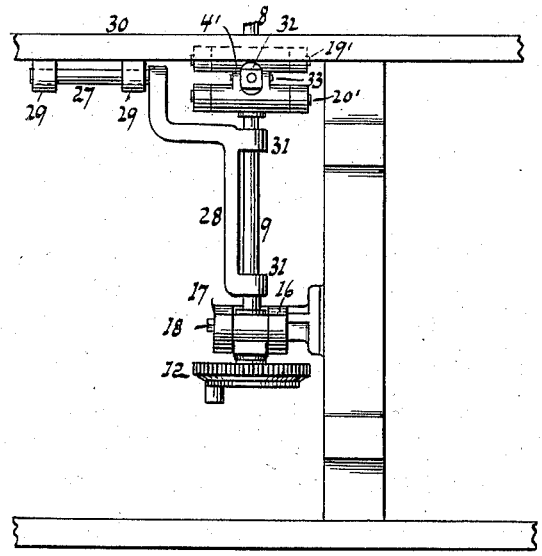

Figure 1 is a side elevation of a universal joint. Fig. 2 is a view like Fig. 1, with parts in a different position than in Fig. 1. Fig. 3 is a plan view of Fig. 1. Fig. 4 is an end view of Fig. 1. Fig. 5 shows a portion of a printing-press. Fig. 6 is a side elevation of Fig. 5. Fig. 7 is a plan view of Fig. 5, the type-bed being removed.

The type-bed 14, Fig. 5, is reciprocated by gear 12, which oscillates so as to alternately engage opposite sides of the bed-actuating rack 13. This gear 12 is secured to the rotating and oscillating shaft 9, which is guided in its oscillations by a slotted yoke or hanger comprising the head or portion 15 and the upright arms or tines 16 and 17. The arm 17 is detachably secured to the head 15 by bolts or fastenings 18. In case the shaft 9 or its box oscillating in the yoke should wear loose the arm 17 can be removed and the face of head 15 suitably filed off, after which the arm 17 can be replaced against such face of the head 15. Any wear can thus be taken up or compensated for, so that the shaft 9 will always be steadily or accurately guided.

The shaft 9 is connected by a universal joint to a driving or rotary shaft 8. Fixed to shafts 8 9 are heads or pieces 1 and 2, Figs. 1 to 4. These heads are connected or jointed centrally by a ball-and-socket joint, the ball of which is shown at 7. The links 3, 4, 5, and 6 are jointed to the heads or pieces 1 2. The links 3 4, as also links 5 6, are jointed together by ball-and-socket joints, the balls of which are indicated at 10 and 11.

The links 3 and 5 have the socket parts 21 and 22, the socket or cap portion 22 being secured by screws or fastenings 23, which enable the caps to be secured for snugly inclosing the balls 10 and 11. The head 1 has the socket portions 24 and 26, which can be drawn together by bolts or fastenings 25 for snugly inclosing the ball 7. By securing one socket portion 24 to head 1 and forming the other socket portion 26 as a cap secured by the fastenings 25 such cap 26 can be removed when required. The caps 22 are also removable on freeing the fastenings 23. By making the balls 7, 10, and 11 removable from head 2 and from links 4 and 6 such balls can be readily replaced when worn.

The links 3 and 5 extend in opposite directions from head 1 and have a common pivot or pivots 19 on said head. The links 4 and 6 are likewise commonly pivoted at 20 on head 2.

In the modification shown in Figs. 5, 6, and 7 the ball 7 is dispensed with and a bell-crank or swinging support 27 28 has its arm or branch 27 journaled at 29 on a suitable frame portion or support 30. The branch 28 has bearings 31 for the shaft 9. The branch 27 forms a pivot, allowing the branch 28 to swing for accompanying the shaft 9 in its oscillations in yoke 15 16 17. The central joint 7 can, however, be retained in the structure of Figs. 5 to 7, if seen fit.

The links 3 and 5, as well as 4 and 6, need not be commonly pivoted, as at 19 20, since, as seen in Fig. 5, the links 3' and 5' each has its individual pivot 19' at opposite end portions of head 1 or on opposite sides of shaft 8, and the link 4' and link 6' also has each its individual pivot 20' on head 2. Instead of jointing the links, as by balls 10 and 11, said links can be jointed by links or blocks 32, Fig. 5, each of which is pivoted at 33 and 34 to a pair of links 4' 3' or 6' 5'. The links 3' 4' 5' 6', by being suitably forked, enable the blocks 32 to be suitably pivoted in said forks. The blocks 32 fit snugly into the forked ends of the links, so that the blocks can swing, but cannot move or wabble laterally between the arms of the forks.

What I claim as new, and desire to secure by Letters Patent, is—

1. The combination with shafts, of pieces or heads secured to the shafts, links for jointing said heads together, and a swinging bell-crank support for one of the shafts, said support having one of its arms provided with bearings for its shaft and having the other arm journaled or rotatively supported substantially as described.

2. A joint comprising shafts 8 and 9, heads 1 and 2 rigidly fixed to the respective shafts, and two pairs of links, one pair being jointed to and oppositely extended from each head, said links having forked ends and blocks pivoted in said forked ends for uniting the links of each head to those of the other head substantially as described.

In testimony whereof I have hereunto set my hand in the presence of two subscribing witnesses.

GEORGE P. FENNER.

Witnesses:
ADELINE A. SMITH,
CARLOS G. CHAMPLIN.